No. 721,446. PATENTED FEB. 24, 1903.
L. HOUSE.
VEHICLE BRAKE.
APPLICATION FILED MAR. 24, 1902.
NO MODEL. 2 SHEETS—SHEET 1.

WITNESSES:
J. J. Laass.
A. F. Kennedy.

INVENTOR
Louis House
By E. Laass
ATTORNEY.

No. 721,446. PATENTED FEB. 24, 1903.
L. HOUSE.
VEHICLE BRAKE.
APPLICATION FILED MAR. 24, 1902.
NO MODEL. 2 SHEETS—SHEET 2.

WITNESSES:
J. J. Laass.
A. F. Kennedy.

INVENTOR
Louis House
By E. Laass
ATTORNEY.

THE NORRIS PETERS CO., PHOTO-LITHO., WASHINGTON, D. C.

UNITED STATES PATENT OFFICE.

LOUIS HOUSE, OF SYRACUSE, NEW YORK.

VEHICLE-BRAKE.

SPECIFICATION forming part of Letters Patent No. 721,446, dated February 24, 1903.

Application filed March 24, 1902. Serial No. 99,649. (No model.)

*To all whom it may concern:*

Be it known that I, LOUIS HOUSE, a citizen of the United States, and a resident of Syracuse, in the county of Onondaga, in the State of New York, have invented new and useful Improvements in Vehicle-Brakes, of which the following, taken in connection with the accompanying drawings, is a full, clear, and exact description.

This invention relates to the class of vehicle-brake mechanisms in which devices are employed and operated in conjunction with the usual brake-shoes to engage the hubs of the rear wheels, and thereby augment the braking power.

One of the objects of the present invention is to provide a mechanism which can be readily applied to a vehicle of any well-known construction and which shall operate to apply a maximum braking force with the requirement of minimum amount of power on the part of a person actuating the mechanism.

Another object of the invention is to provide a mechanism which shall be simple, strong, and durable in construction and shall possess a neat appearance when applied to the vehicle and shall also be inexpensive in its manufacture; and, still further, the object is to provide the mechanism with means for locking the parts in braking position and with means which shall automatically move said parts out of said position when unlocked.

To that end the invention consists in the novel construction and arrangement of parts, as hereinafter fully described, and set forth in the claims.

Figure 1:
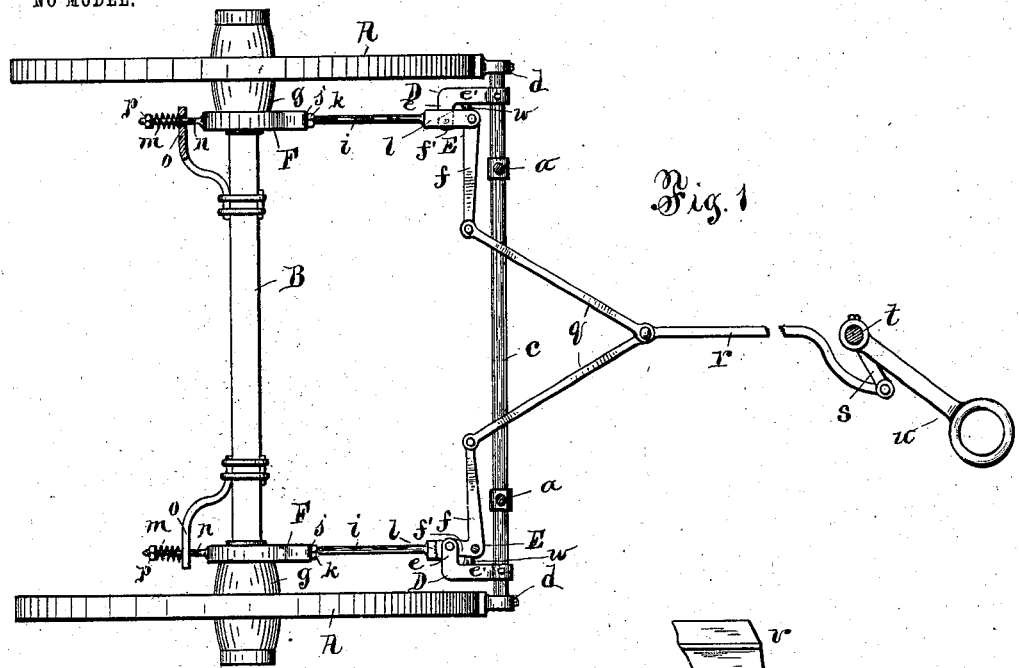
Figure 2:
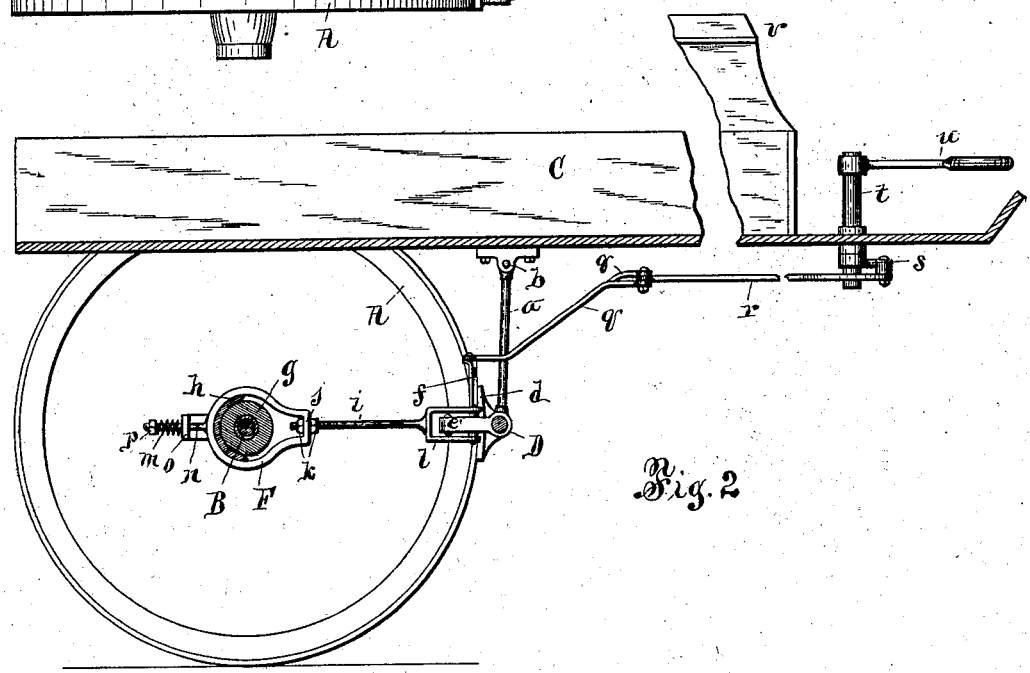
Figure 3:
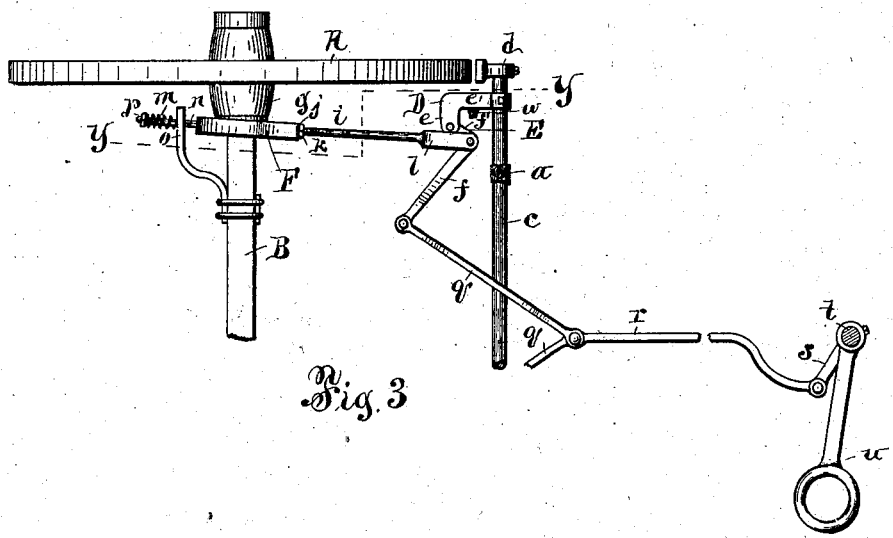
Figure 4:
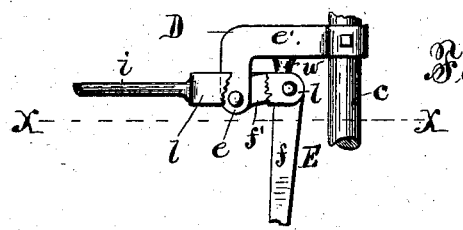
Figure 5:
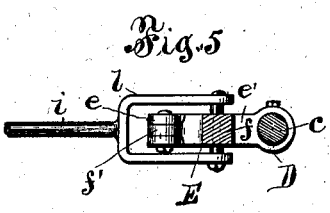
Figure 6:
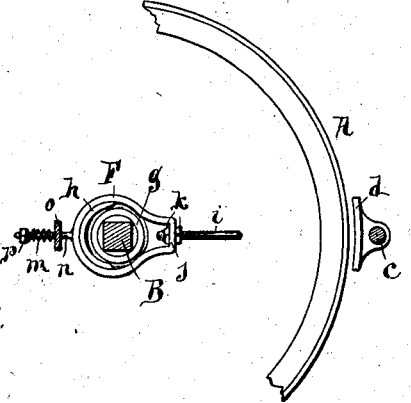

In the accompanying drawings, Figure 1 represents a plan view of my improved brake mechanism and showing the parts in braking position. Fig. 2 is a vertical longitudinal section of a portion of a vehicle, also showing the mechanism in braking position. Fig. 3 is a plan view of a portion of the brake mechanism, the same being shown out of braking position. Fig. 4 is an enlarged plan view showing in detail a portion of the mechanism to better illustrate the same. Fig. 5 is a vertical longitudinal section on line X X in Fig. 4, and Fig. 6 is a vertical longitudinal section on line Y Y in Fig. 3.

Similar letters of reference indicate corresponding parts.

A A denote the rear wheels of the vehicle, B the axle thereof, and C the body, which may be mounted on said axle in any suitable manner.

$a\ a$ represent hangers, two of which are preferably employed and are pivoted to the bottom of the body C, as indicated at $b$, to the free ends of which hangers is secured a transverse bar $c$, on the ends of which are carried the usual brake-shoes $d\ d$, disposed to bear on the peripheries of the wheels A A in the well-known manner. To said bar $c$, adjacent to the respective shoes $d\ d$, are rigidly secured a pair of brackets D D, which extend rearwardly from the bar and are each formed of two integral arms $e\ e'$, disposed substantially at right angles or L-shaped. Said brackets are disposed oppositely and horizontally—*i. e.*, with their arms $e\ e$ extending toward each other—as clearly shown in Fig. 1 of the drawings.

E E denote elbow-levers, which are disposed to have their arms $f\ f$ projecting inwardly or toward each each other and their arms $f'$ pivoted in bifurcations formed in the ends of the arms $e\ e$ of the aforesaid brackets D D. Said elbow-levers are thus fulcrumed on the transverse brake-bar $c$ through the mediums of the aforesaid brackets.

F F are elongated inflexible yokes, which may be constructed in various ways to allow them to be moved into frictional contact with the rear portions of the wheel-hubs, while maintaining the forwardly-extending arms of the yokes constantly out of such contact, thus obviating abrasion of said arms and maintaining the yoke intact. The segmental rear portions or frictional bows of the yokes are disposed facing directly the rear portion of the wheel-hubs and are provided on their front faces with wear-blocks $h$ of any suitable material and secured to said portions of the yokes in any suitable manner to allow said wear-blocks to be renewed when required. The free ends of the forwardly-extending yoke-arms are connected by rods $i$ to the elbow-levers E E to cause the yokes and brake-shoes $d\ d$ to move in unison to and from their respective braking positions. The rear ends of the rods *i i* pass through vertical bars *j j*, formed on the free ends of the yoke-arms, and are provided with nuts *k k*, disposed at opposite sides of bars *j j*, whereby said yokes are adjustably connected to said rods. The forward ends of the rods *i i* are formed with forks *l l*, which embrace the elbow-levers E E and are pivoted to the angles thereof, as more clearly shown in Figs. 4 and 5 of the drawings. Said pivotal connections of the rods *i i* to the elbow-levers are disposed in front of the pivotal connections of the elbow-levers and brackets and out of line therewith in relation to the axes of said rods, whereby the shoes *d d* and yokes F F will be locked in their braking positions, as hereinafter more fully described, and clearly shown in Fig. 4 of the drawings.

The shoes *d d* and yokes F F are normally retained out of braking position by means of coiled springs *m m*, which surround stems *n n*, projecting rearwardly from the yokes, and bear against guides *o o*, rigidly secured to the axle, the rear ends of which springs bear against nuts *p*, applied to the screw-threaded ends of said stems. The stems are disposed to slide in said guides, whereby the yokes F F are sustained in proper positions in relation to the hubs *g g* in their movements to and from the same.

Any suitable means may be employed for actuating the aforesaid elbow-levers to move the shoes *d d* and yokes F F into braking positions. However, I prefer to use the devices shown, which consist of toggle-arms *q q*, pivotally connected at their rear ends to the ends of the arms *f f* of the elbow-levers and at their forward ends to a rod or bar *r*, which is connected by a short lever *s* to a vertical shaft *t*, which is suitably journaled near the front end of the platform or bottom of the body C. To the upper end of the shaft *t* is rigidly secured a foot-lever *u*, which is disposed in a position whereby a person mounted upon the seat *v* of the vehicle is enabled to conveniently operate the lever. The forward movement of said lever *u* shifts the rod or bar *r* likewise, whereby the toggle-arms *q q* actuate the elbow-levers E E, and by reason of the pivotal connections of said elbow-levers with the aforesaid brackets D D and rods *i i* the shoes *d d* and yokes F F are simultaneously moved into braking positions, as illustrated in Figs. 1 and 2 of the drawings, and the pivotal connections of the rods being disposed in front of the pivotal connections of the elbow-levers and brackets and out of line therewith in relation to the axes of said rods, as hereinbefore explained, said shoes and yokes are effectually locked in braking positions. I preferably provide the aforesaid brackets D D with suitable stops *w w*, as more clearly shown in Fig. 4 of the drawings, which stops consist of lugs projecting from the arms *e' e'* of the brackets and serve to limit the movement of the elbow-levers in applying the aforesaid shoes and yokes in the operation of braking. It will be seen that by the rearward movement of the aforesaid foot-lever *u* the elbow-levers will be actuated to unlock the parts, whereby the aforesaid coiled springs will automatically move said shoes and yokes out of braking positions and effectually retain the same in said unlocked condition.

The adjustable connections of the yokes to the rods *i i*, as hereinbefore described, serve to retain the shoes and yokes the desired distances from the peripheries of the wheels and hubs, respectively, when out of braking positions, and also serve to take up the wear on said parts.

The locking of the brake mechanism is one of the important features of my invention from the fact that the driver of the vehicle can safely leave the horse or horses standing. I do not wish to be understood, however, that the described brake mechanism is intended only for vehicles drawn by horses, as the same can be readily applied to automobiles and railway-cars, and, as hereinbefore stated, I do not confine myself to the devices shown and described for operating the brake mechanism nor to the use of manually-operated means, inasmuch as any power may be utilized for the purpose which would be found necessary in the application of the invention to railway-cars. Neither do I limit myself to the specific construction of the brake mechanism as shown and described, as the same is subject to various modifications without departing from the spirit of the invention.

What I claim as my invention is—

1. The improved vehicle-brake consisting essentially of yokes, each composed of a segmental friction-bow facing directly the rear portion of the wheel-hub, and arms extending forward from the ends of the said bow and beyond the front of the hub, in combination with a brake-bar extending across the fronts of the wheels and equipped with brake-shoes, levers fulcrumed on said brake-bar, rods connecting said levers to the aforesaid yoke-arms, and means for actuating said levers.

2. The combination, with the vehicle-axle and its wheels, of yokes, each composed of a segmental friction-bow facing directly the rear portion of the wheel-hub and arms extending forward from the ends of said bow and beyond the front of the hub, springs forcing the yokes rearward, a brake-bar extending across the fronts of the wheels and equipped with brake-shoes, levers fulcrumed on said brake-bar, rods connecting said levers to the aforesaid yoke-arms, and means for operating said levers in opposition to the force of the aforesaid springs as set forth.

3. A vehicle-brake mechanism comprising the usual shoes, laterally-movable yokes disposed to embrace the rear faces of the wheel-hubs, means for actuating said shoes and yokes to move the same simultaneously into and out of braking positions, and a lock for retaining the same in said positions, as set forth.

4. A vehicle-brake mechanism comprising the usual shoes, guides secured to the rear of the vehicle-axle, laterally-movable yokes disposed to embrace the rear faces of the wheel-hubs, and formed with rearwardly-projecting stems sliding in said guides, suitable connections between said shoes and yokes, coiled springs surrounding said stems and bearing against the guides and serving to normally retain the shoes and yokes out of braking positions, elbow-levers connected to the shoes and yokes, toggle-arms pivotally connected to said elbow-levers, and means for operating said toggle-arms whereby the shoes and yokes are moved into the aforesaid positions as set forth.

5. A vehicle-brake mechanism comprising the usual shoes, laterally-movable yokes disposed to embrace the rear faces of the wheel-hubs and suitably connected to the shoes, means normally retaining said shoes and yokes out of braking positions, elbow-levers connected to said shoes and yokes, toggle-arms connected to said elbow-levers and extending forwardly therefrom, a horizontal bar or rod pivotally connected to the forward ends of said toggle-arms, a suitably-journaled vertical shaft at the front end of the vehicle and connected at its lower end by a lever to the forward end of said horizontal bar or rod, and a foot-lever rigidly connected to the upper end of said vertical shaft for turning the same whereby the aforesaid shoes and yokes are moved into braking positions as set forth.

6. A vehicle-brake mechanism comprising hangers pivoted to the vehicle-body, a transverse bar secured to the free ends of said hangers, brake-shoes carried on the ends of said bar, brackets rigidly secured to said bar, elbow-levers pivoted to said brackets, laterally-movable yokes disposed to embrace the rear faces of the wheel-hubs and having pivotal connections with said elbow-levers, toggle-arms connected to the elbow-levers, means for operating said toggle-arms whereby said shoes and yokes are moved simultaneously into braking positions, and means for automatically moving said shoes and yokes out of said positions as set forth.

7. A vehicle-brake mechanism comprising hangers pivoted to the vehicle-body, a transverse bar secured to the free ends of said hangers, brake-shoes carried on the ends of said bar, brackets rigidly secured to said bar near the ends thereof, elbow-levers pivoted to said brackets, laterally-movable yokes disposed to embrace the rear faces of the wheel-hubs, forwardly-extending rods rigidly secured at their rear ends to said yokes and formed at their front ends with forks embracing said elbow-levers and pivoted thereto, arms pivoted to said elbow-levers and extending forwardly therefrom, means for actuating said arms whereby the said shoes and yokes are moved simultaneously into braking positions, and means disposed at the rear of said yokes serving to automatically move said yokes and the shoes connected therewith out of braking positions as set forth.

8. A vehicle-brake mechanism comprising hangers pivoted to the vehicle-body, a transverse bar secured to the free ends of said hangers, brake-shoes carried on the ends of said bar, oppositely-disposed brackets rigidly secured to said bar adjacent to the said shoes, elbow-levers pivoted at the ends of one arm thereof to the said brackets, arms pivoted to the ends of the other arms of the elbow-levers, and extending forwardly therefrom, laterally-movable yokes disposed to embrace the rear faces of the wheel-hubs, forwardly-extending rods adjustably secured at their rear ends to said yokes and formed at their front ends with forks embracing said elbow-levers and pivoted at the angles thereof, springs suitably connected to said yokes whereby said yokes and shoes are normally retained out of braking positions, and means for actuating the aforesaid forwardly-extending arms to move said shoes and yokes into braking positions as set forth.

9. A vehicle-brake mechanism comprising hangers pivoted to the vehicle-body, a transverse bar secured to the free ends of said hangers, brake-shoes carried on the ends of said bar, oppositely and horizontally disposed L-shaped brackets rigidly secured to said bar adjacent to said shoes, elbow-levers pivoted at the ends of one arm thereof to the ends of one of the arms of the brackets, suitably-actuated forwardly-extending arms pivoted to the ends of the other arms of the elbow-levers, laterally-movable yokes disposed to embrace the rear faces of the wheel-hubs, rods secured rigidly at one end to said yokes and formed at their opposite ends with forks embracing said elbow-levers and pivotally connected at the angles thereof, said pivotal connections being disposed in front of the pivotal connections of the elbow-levers and brackets and out of line therewith in relation to the axes of the aforesaid rods, whereby the operation of the aforesaid forwardly-extending arms causes the shoes and yokes to be moved simultaneously into braking positions and locked, stops on the aforesaid brackets limiting the braking movement of the elbow-levers, and suitably-supported springs connected to the rear of said yokes and serving to move the shoes and yokes automatically out of braking positions when said shoes and yokes are unlocked as set forth.

LOUIS HOUSE.

Witnesses:
J. J. LAASS,
A. F. KENNEDY.